(12) United States Patent
Mayer et al.

(10) Patent No.: US 8,231,364 B2
(45) Date of Patent: Jul. 31, 2012

(54) ELECTRIC HEATING AND TEMPERATURE CONTROL FOR PROCESS PUMPS

(75) Inventors: James Mayer, Cedar Falls, IA (US); Michael Ramsey, Evansdale, IA (US); Steven Volkman, Cedar Falls, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 636 days.

(21) Appl. No.: 12/500,405

(22) Filed: Jul. 9, 2009

(65) Prior Publication Data
US 2011/0008194 A1  Jan. 13, 2011

(51) Int. Cl.
*F04B 17/03* (2006.01)
*F04B 39/00* (2006.01)
*F04B 53/00* (2006.01)

(52) U.S. Cl. .......................... 417/420; 417/440; 417/572
(58) Field of Classification Search .................. 417/420, 417/572, 310, 440; 310/103–104
See application file for complete search history.

(56) References Cited

U.S. PATENT DOCUMENTS

| | | | | |
|---|---|---|---|---|
| 3,242,872 A | * | 3/1966 | Thompson | 210/391 |
| 5,263,829 A | * | 11/1993 | Gergets | 417/420 |
| 5,322,421 A | * | 6/1994 | Hansen | 417/420 |
| 5,494,416 A | * | 2/1996 | Gergets | 417/420 |
| 6,270,324 B1 | * | 8/2001 | Sullivan et al. | 417/420 |
| 6,793,466 B2 | * | 9/2004 | Miyamoto | 417/313 |
| 7,029,246 B2 | * | 4/2006 | Miller et al. | 417/420 |

* cited by examiner

*Primary Examiner* — Devon C Kramer
*Assistant Examiner* — Bryan Lettman
(74) *Attorney, Agent, or Firm* — Miller, Matthias & Hull LLP

(57) ABSTRACT

Electrically heated pumps are disclosed that include electric heating elements that are linked to a process controller. In a magnetic drive pump, the external jacketing on the pump head, pressure relief valve and casing can be replaced with electric heating elements attached to the pump through the use of adhesive or mechanical fastening devices. For the bracket portion of the magnetic drive pump, the external jacketing can be removed and the heating element is attached to the canister that contains the liquid and that is located between the inner and outer magnetic drive assemblies. Through the use of appropriately placed thermocouples in the head, pressure relief valve, casing, bracket, canister, etc., and a single or multi-channel on/off, proportional or PID controller, the heating zones may be linked together, monitored and controlled to the application requirements. The disclosed pump designs may also be applied to auxiliary equipment such as strainers.

19 Claims, 6 Drawing Sheets

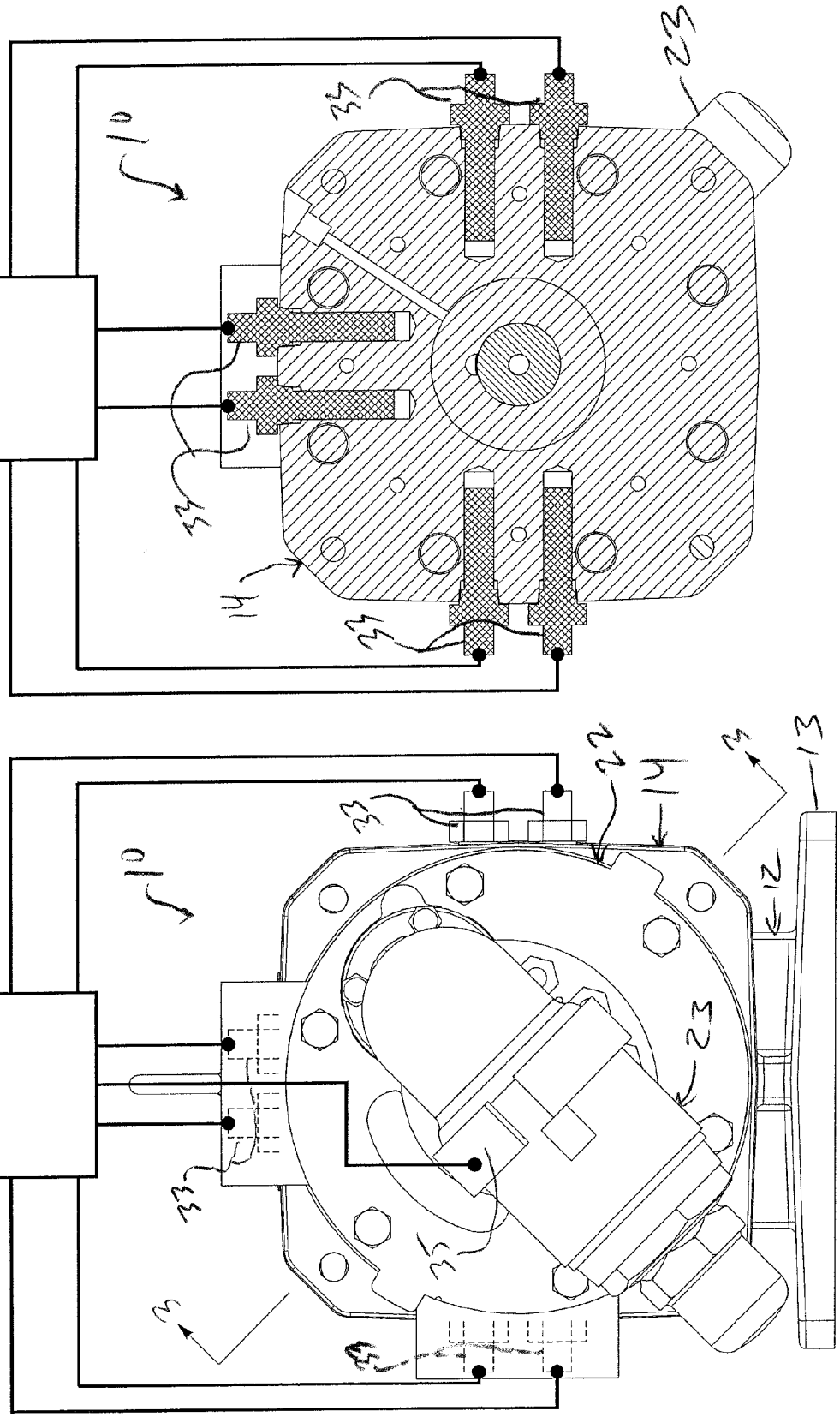

ELECTRIC HEATING AND TEMPERATURE CONTROL FOR PROCESS PUMPS

BACKGROUND

1. Technical Field

Improved heating systems are disclosed for variety of pumps including, but not limited to, magnetic drive pumps, mechanical seal pumps other types of internal gear pumps and external gear pumps as well. More specifically, combination heat and temperature control systems for integration into existing pumps are also disclosed for the support and control of pipeline heat tracing.

2. Description of the Related Art

Certain applications require external heat sources to be applied to a process system, including one or more pumps of a process system, to maintain a required temperature and/or to enable desired flow rates of the material being processed. Currently available heaters for pumps include cartridge heaters, platen heaters, tubing coils and blanket or jacket heaters.

Cartridge heaters may be used to heat inlet or outlet piping or the pump casing and to regulate pump or material temperature. There are several limitations to the use of cartridge heaters. First, because of the bulk of the typical cartridge heater, there is a substantial distance between the heater and the material to be heated and pumped. The long heat transfer path means longer heat up times, which is compounded by the large thermal mass of a cartridge heater, the inevitable radiation heat loss and limitations on power density or heat flux when the cartridge heater is distanced from the material to be heated and pumped. Furthermore, cartridge heaters often require a high precision intermediate thermal conducting layer to improve the contact between the heater and the component surrounding the material to be heated. This additional layer, which often is in the form of a precious metal layer, and adds significantly to the cost of the pump. Finally, cartridge heaters can be placed in limited locations within a pump due to geometry and space constraints. Thus, cartridge heaters are limited in their use on pumps of process systems.

Platen heaters are used to heat a plate-like body which can be attached to a pump casing or base structure. For example, platen heaters are commonly used in diffusion pumps, which, in turn are used for high and ultra high vacuums. A platen heater is typically provided in a plate attached below the base of the outer body of a diffusion pump. Similar to cartridge heaters, because of the bulk of the typical platen heater and the bulk of the plate, there is a significant distance between the platen heater and the fluid to be heated. The long heat transfer path means longer heat up times, which is compounded by the large thermal mass of a typical platen heater and the base of the pump. Platen heaters, like cartridge heaters, can only be placed in limited locations due to geometry and space constraints.

Other techniques for heating pumps include the use of steam or hot oil and tubing wrapped around one or more pump components. Obviously, these strategies add significantly to the overall bulk of the pump design and are impractical in applications where space is limited and in mobile applications where access to steam or hot oil is limited or not available.

Blanket or jacket heaters are cumbersome and bulky. Further, these types of add-on heaters must often be disposed a substantial distance from the material to be heated and therefore require long heat up times and are limited in terms of control and accuracy.

As a result, there is a need for improved heaters or heating elements that can be incorporated into a variety of pumps, including existing pumps that avoids the disadvantages associated with cartridge heaters, platen heaters and heat exchangers.

SUMMARY OF THE DISCLOSURE

Improved electrically heated pumps are disclosed. By applying electric heating techniques to the existing pump designs and other auxiliary equipment (e.g., strainers), existing infrastructure may be employed to support and control pipeline heat tracing. The disclosed pump designs are useful in both stationary facilities and mobile applications.

One disclosed magnetic drive pump comprises flexible membrane heaters on the proximal end of the canister, band heaters on the pump casing and pressure relief valve and cartridge heaters in the adapter plate and, optionally, the crescent area of the head plate. The heaters, which may include optional integrated thermocouples, may be linked to a controller and the pump may also comprise thermocouples linked to the controller.

Another disclosed pump comprises cartridge heaters on the outer bracket and crescent area of the head plate and band heaters on the pump casing and pressure release valve. The cartridge and band heaters, which may include optional integrated thermocouples, may also be linked to a controller and the pump may also comprise thermocouples linked to the controller.

The disclosed pumps comprise electric heating elements that are linked to a process controller. The disclosed pump designs can be applied to internal gear pumps including, but not limited to packed seal, lip seal, mechanical seal and magnetic drive pumps and external gear pumps as well. For packed, lip and mechanical seal pumps, the external jacketing on the pump, including the head, pressure relief valve, casing and bracket, can be replaced with electric heating elements, such as flexible or custom form membranes, attached to the pump through the use of adhesive or mechanical fastening devices. For the magnetic drive pump, the external jacketing on the pump (head, pressure relief valve and casing) can be replaced with electric heating elements attached to the pump through the use of adhesive or mechanical fastening devices. For the bracket portion of the magnetic drive pump, the external jacketing can be removed and the heating element is attached to the canister that contains the liquid and that is located between the inner and outer magnetic drive assemblies. Through the use of appropriately placed thermocouples in the head, pressure relief valve, casing, bracket, canister, etc., and a single or multi-channel on/off, proportional or PID controller, the heating zones may be linked together, monitored and controlled to the application requirements. The disclosed pump designs may also be applied to auxiliary equipment such as strainers.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings. While two internal gear pumps are shown as exemplary embodiments, this disclosure is applicable to external gear pumps as well.

FIG. 4 is an end view of the magnetic drive pump illustrated in FIGS. 1-3.

FIG. 5 is a sectional view of the magnetic drive pump illustrated in FIGS. 1-4, taken substantially along line 5-5 of FIG. 2.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein. Specifically, this disclosure is applicable to internal gear pumps other than the magnetic drive and mechanical seal pumps and this disclosure is applicable to external gear pumps as well.

DETAILED DESCRIPTION OF THE PRESENTLY PREFERRED EMBODIMENTS

Figure 1:
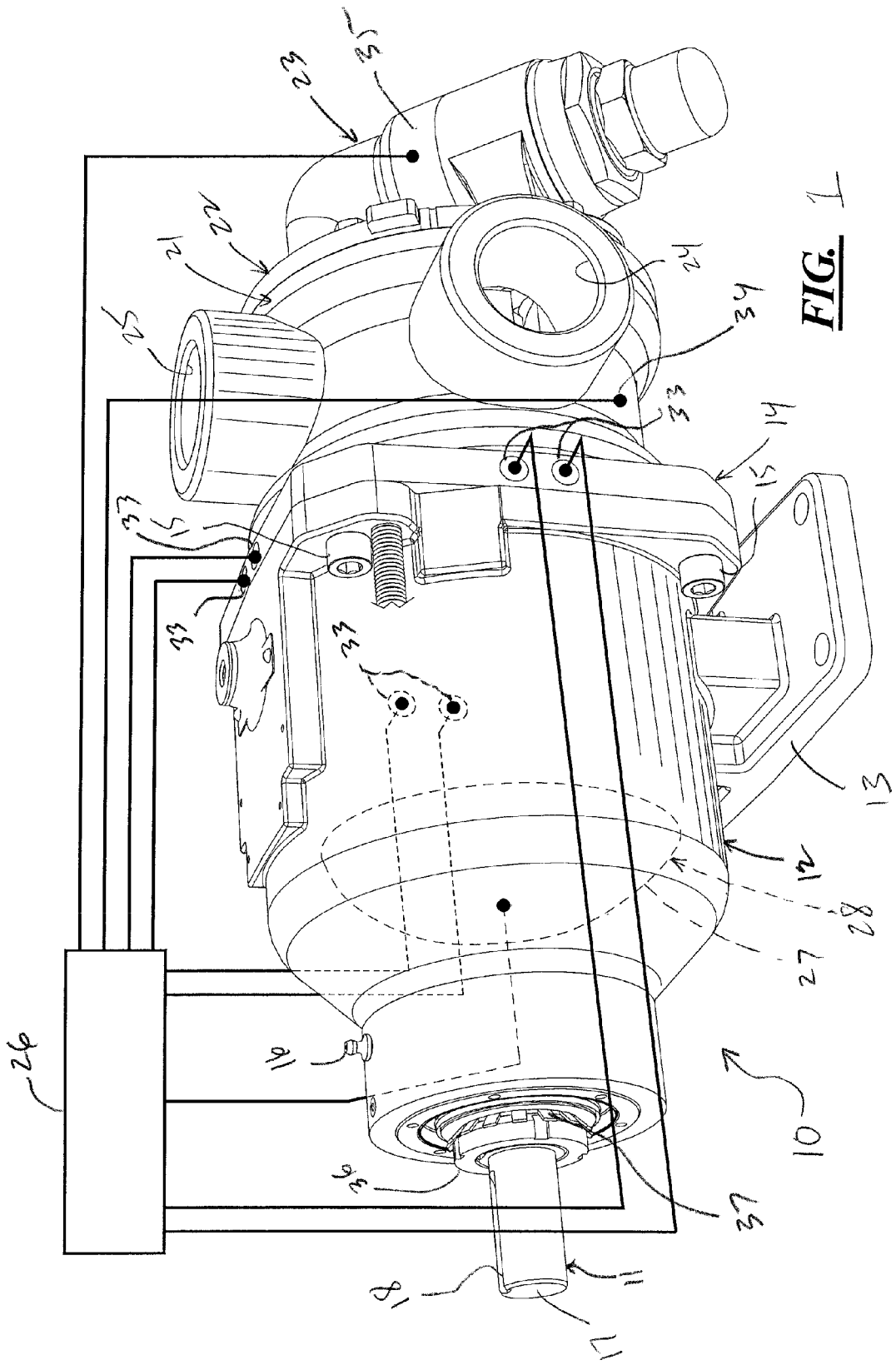
FIG. 1 is a perspective view of a magnetic drive pump equipped with electric heaters in accordance with this disclosure.
Figure 2:
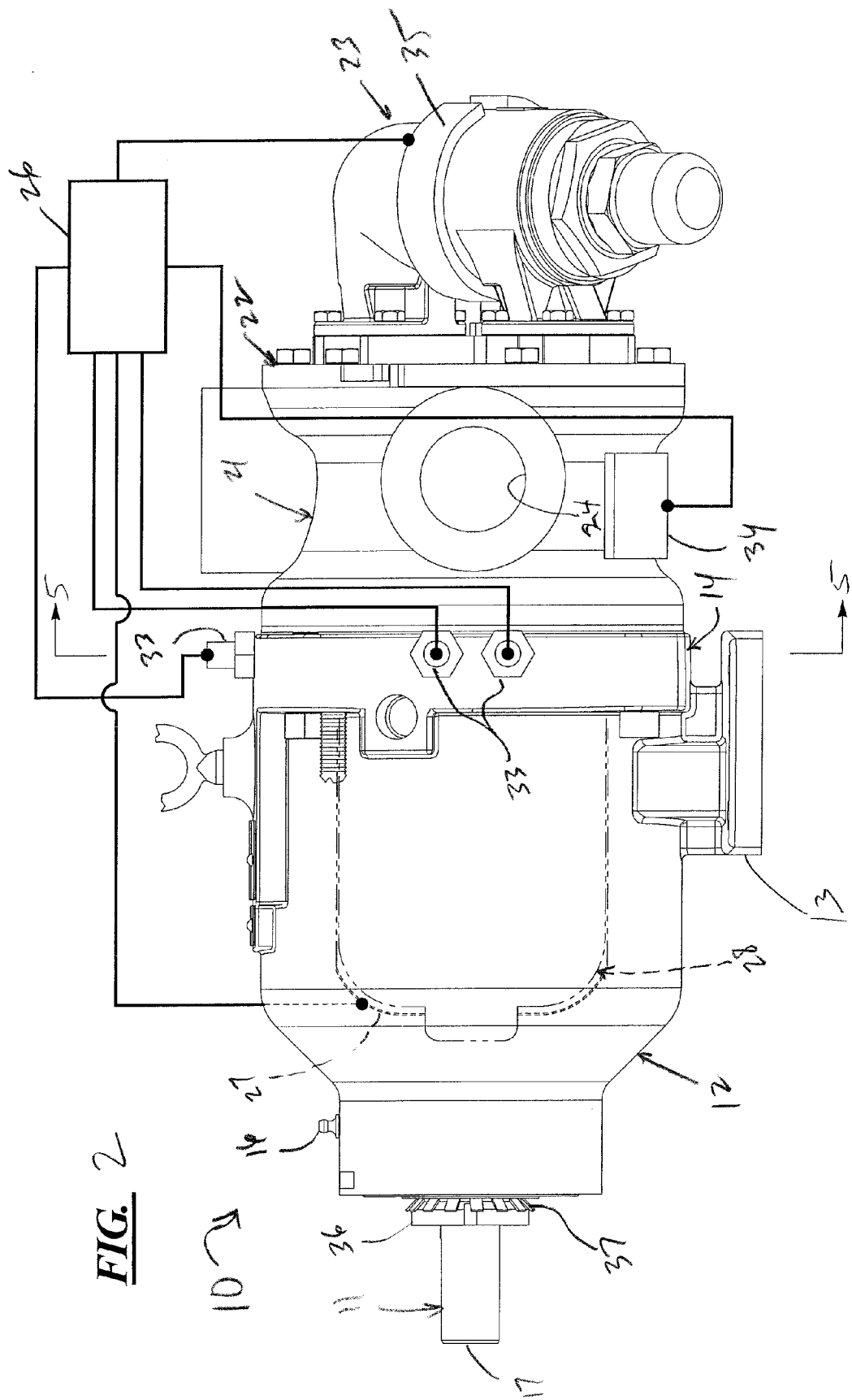
FIG. 2 is a front plan view of the magnetic drive pump shown in FIG. 1.

A magnetic drive pump 10 equipped with a plurality of electric heaters is illustrated in FIGS. 1-5. Referring first to FIGS. 1-2, the pump 10 includes an outer drive shaft 11 that extends into an outer bracket 12. The bracket 12 includes a footing or base 13 and is connected to an adapter plate 14 by plurality of fasteners 15. The outer bracket 12 also includes a lubrication injection port 16. The outer drive shaft 11 includes a proximal end 17 with a slot 18 for receiving a key of an electric motor (not shown). FIGS. 1-2 also illustrate the casing 21 that is sandwiched between the adapter plate 14 and the head plate or head cover 22. The head plate 22, in turn, is sandwiched between the casing 21 and a pressure release valve assembly 23. The casing includes inlet and outlet ports 24, 25 respectively for a shaft 58 that rotates clockwise, or inlet and outlet ports 25, 24 for a shaft rotation counterclockwise.

As will be discussed in greater detail below, FIG. 1 also illustrates the use of a controller 26 which is linked to a plurality of electric heating elements including various combinations of: a flexible membrane heater 27 disposed on the canister 28 which is disposed between the inner and outer magnet assemblies 31, 32 (see FIGS. 2 and 3); one or more cartridge heaters 33 disposed in the adapter plate 14; a band heater 34 that extends at least partially around the casing 21; and a band heater 35 that extends at least partially around a portion of the pressure relief valve 23. Additional heating elements (not shown in FIG. 1) may optionally be placed in the head plate 22 as will be discussed below in connection with FIG. 6. FIGS. 1 and 2 also illustrate the locknut 36 and water 37 that may be used to secure the drive shaft 11 against a spacer 38 and bearing in 39 as illustrated in FIG. 3.

Figure 3:
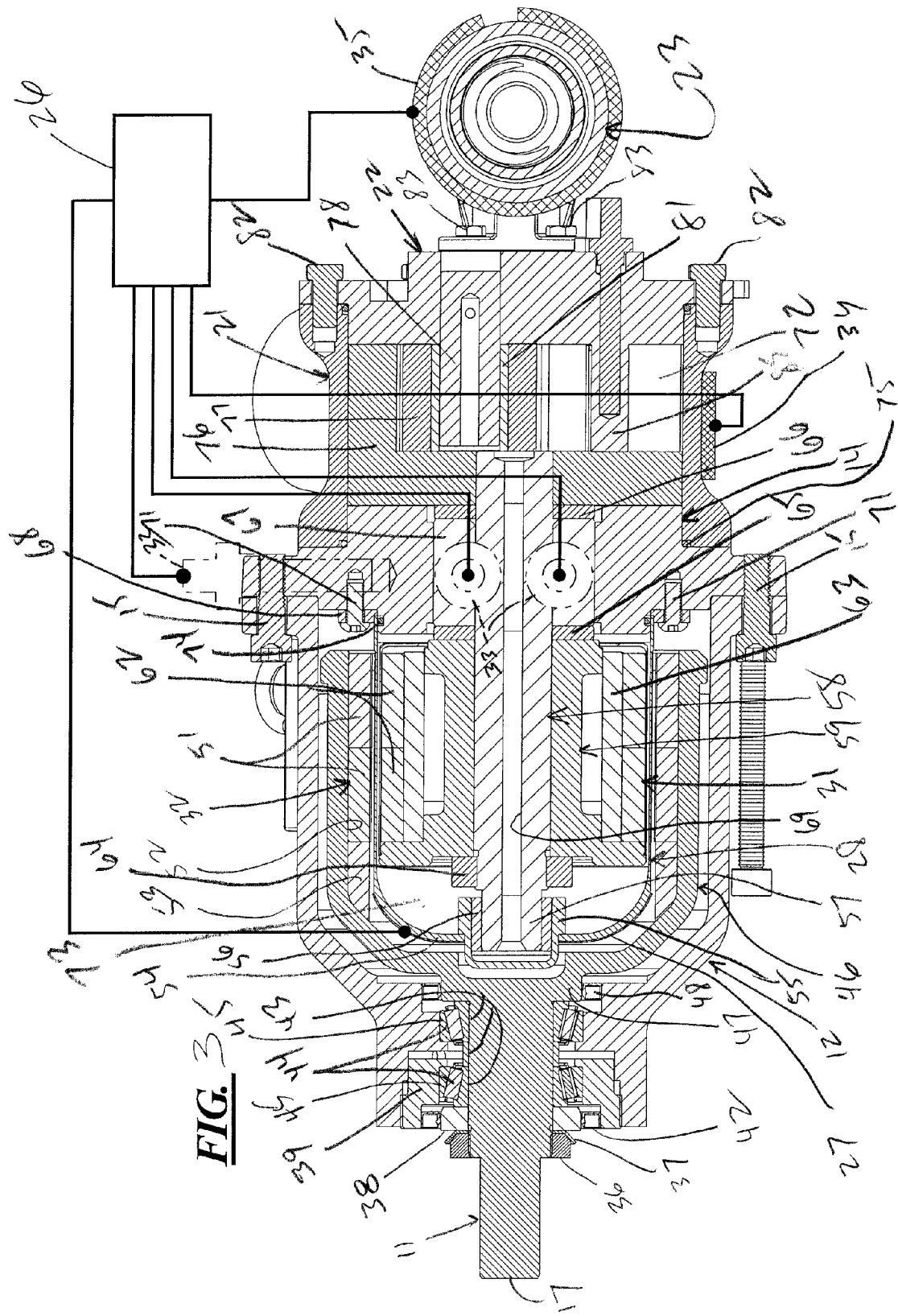
FIG. 3 is a sectional view of the magnetic drive pump shown in FIGS. 1 and 2 taken substantially along line and 3-3 of FIG. 4.

Turning to FIG. 3, a proximal end 17 of the drive shaft 11 is held in place against the spacer 38 by the locknut 36. The spacer 38 rotates with the drive shaft 11 and is supported by the bearing 42. Additional spacers 43 support the proximal end of the driveshaft 17 and are accommodated within the bearings 44 which are sandwiched between the spacers 43 and skin elements or covers 45. The outer drive shaft 11 has a stepped configuration between its proximal end 17 and where the shaft 11 connects to the annular outer magnet carrier 46. A stepped portion 47 of the shaft 11 is disposed between the outer magnet carrier 46 and the proximal end 17 of the shaft 11. The stepped portion 47 is supported within the outer bracket 12 by the bearing 48.

The outer magnet carrier 46 of the drive shaft 11 carries the outer magnet assembly 32 which includes circumferentially spaced apart outer magnets 51. The outer magnets 51 are held in place against the inner surface 52 of the carrier 46 by conventional means, including the potting shown at 53. The outer carrier 46 rotates freely within the outer bracket 12 with the rotation of the drive shaft 11.

Rotation of the outer magnet carrier 46 and outer magnets 51 imparts rotation to the inner magnet assembly 31. Specifically, the fixed canister 28 is disposed between the inner and outer magnet assemblies. The canister 28 includes a proximal end 54 that receives a canister bearing insert 55 and canister bearing 56. The canister bearing 56 rotatably supports a proximal end 57 of a rotor shaft 58 in an annular cavity 73. The rotor shaft 58 passes through and is connected to an inner magnet carrier 59 that is fitted onto the shaft 11 with a key (not shown) that enables the insert 59 to rotate with the shaft 58. The inner magnet carrier 59 supports the inner magnet assembly 31 which includes a plurality of circumferentially spaced inner magnets 62 that are mounted on a sleeve 63. The insert 59 is held in place by the clamp nut 64 which presses the insert 59 against the thrust washer 65. The thrust washer 65, in combination with the thrust washer 66, sandwiches the adapter plate bushing 67 in place within the adapter plate 14. The canister 28 is held in place against the adapter plate 14 by the canister retaining ring 68 which is connected to the adapter plate by the fasteners 71.

For the inlet port 24 and outlet port 25 and clockwise shaft 58 rotation as shown in the FIGS. 1 and 3, the fluid flows from outlet port 25, behind the rotor 76, through a groove (not shown) in adaptor bushing 67, past the thrust washers 65, 66, through a gap (not shown) between inner magnet assembly 31 and the canister 28 to the end 54 of the canister 28, through a groove (not shown) in canister bushing 56, and then down the channel 69 in the rotor shaft 58 towards the pump chamber 72. Thus, fluid from the pump chamber 72 is used to lubricate the canister bearing 56 and the adapter plate bearing 67. Fluid from the pump chamber 72 also serves as a coolant. However, fluid is prevented from migrating outside of the canister 28 or between the adapter plate 14 and casing 21 by the O-rings 74, 75.

The rotor shaft 58 is connected to a rotor 76 disposed within the pump chamber 72. The rotor 76 is enmeshed with an idler 77 that rotates about an idler pin 78 that is connected to the head plate 22. The idler 77 is supported on the idler pin 78 by the bushing 81. The head plate 22 is held in place against the casing 21 by the fasteners 82. The pressure relief valve assembly 23 is secured to the head plate 22 by the fasteners 83. The rotor 76 and idler 77 rotate respectively below and above a crescent 85 formed in the head plate 22.

As shown in FIGS. 3-5, the controller 26 that is linked to cartridge heaters 33 in the adapter plate 14, the flexible membrane heater 27 disposed on the proximal end 54 of the canister 28, the band heater 34 that wraps at least partially around the casing 21 and the band heater 35 that wraps at least partially around the pressure relief valve assembly 23. Additional cartridge heaters may be placed in the head plate crescent area 22 as illustrated in FIG. 6.

Figure 6:
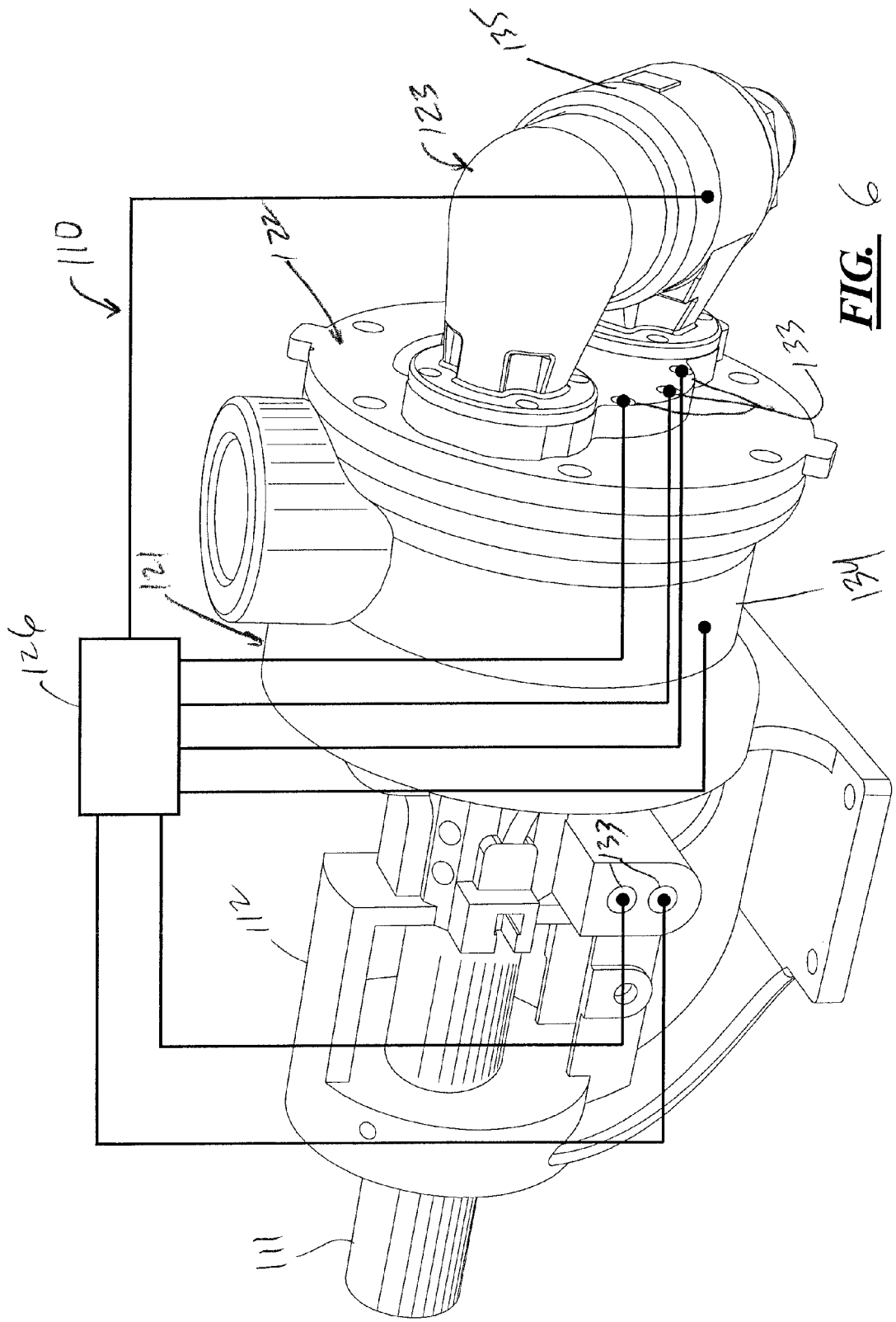
FIG. 6 is a perspective view of a seal pump equipped with electric heaters in accordance with this disclosure.
Figure 7:
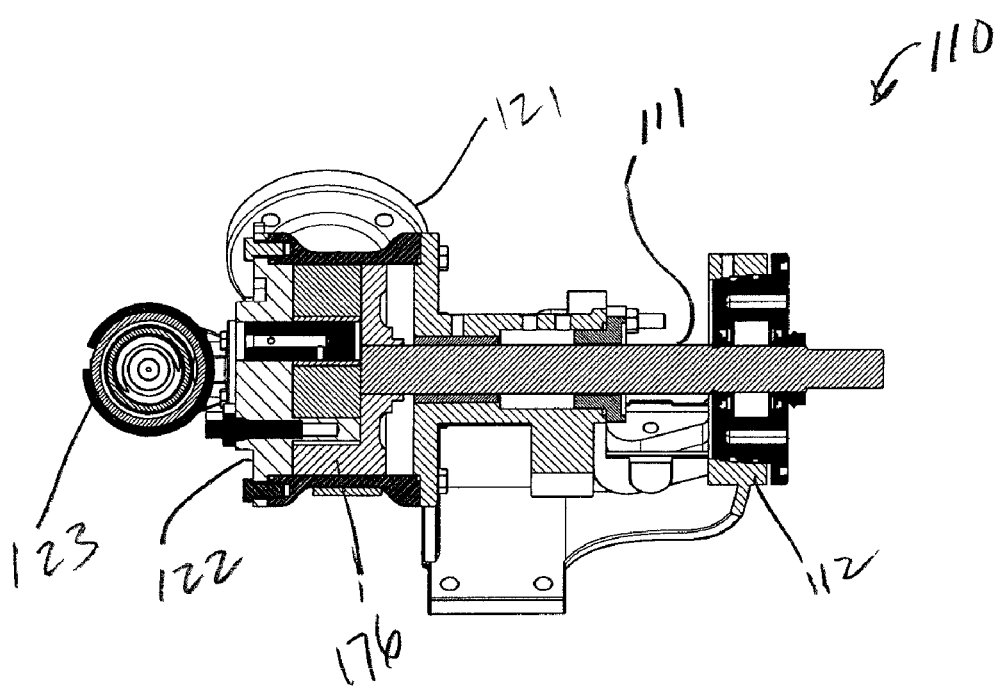
FIG. 7 is a sectional view of the seal pump illustrated in FIG. 6.

FIGS. 6-7 illustrate a seal pump 110 with a driveshaft 111 that passes through an outer bracket 112 before being connected to a rotor 176 disposed within a pump casing 121. The head plate 122 and pressure relief valve 123 may be identical to the head plate crescent area 22 and pressure relief valve 23 of the pump 10 illustrated in FIGS. 1-5. To provide consistent and controllable heating for the pump 110, a controller 126 is linked to cartridge heaters 133 disposed in the outer bracket 112 and in the head plate 122 as well as band heaters 134, 135 disposed on the casing 121 and pressure relief valve 123 respectively.

The application of electric heating elements 33-35, 133-135 and the linked process control 26, 126 of multiple heating elements 33-35, 133-135 is disclosed. The techniques and designs disclosed herein can be applied to packed seal, lip seal, mechanical seal and magnetic drive pumps. For packed, lip and mechanical seal pumps 110, the external jacketing on the head plate 122, pressure relief valve 123, pump casing 121 and bracket 112 can be replaced with electric heating elements 133-135, such as flexible or custom form membranes, attached to the pump through the use of adhesive or mechanical fastening devices as will be apparent to those skilled in the art. For magnetic drive pumps 10, the external jacketing on the pump head 22, pressure relief valve 23 and casing 21 can be replaced with electric heating elements 33-35 attached to the pump 10 through the use of adhesive or mechanical fastening devices as will be apparent to those skilled in the art. For the bracket portion 12 of the magnetic drive pump 10, the external jacketing is removed and the heating element 27 is attached to the canister 28 that contains the liquid being pumped and is located between the inner and outer magnetic drive assemblies 31, 32, internal to the pump 10. Through the use of appropriately placed thermocouples in the heads 22, 122, pressure relief valve 23,123, casings 21, 121, brackets 12, 112, canister 28, and single or multi-channel on/off, proportional or PID controllers 26, the heating zones may be linked together, monitored and controlled to the application requirements. This solution may also be applied to auxiliary equipment such as strainers (not shown).

While only certain embodiments have been set forth, alternatives and modifications will be apparent from the above description to those skilled in the art. As noted above, in addition to internal gear pumps, the designs disclosed above are applicable to external gear pumps. Band heaters may be employed in addition to or as an alternative to flexible membrane heaters. These and other alternatives are considered equivalents and within the spirit and scope of this disclosure and the appended claims.

The invention claimed is:

1. A magnetic drive pump comprising:
    an outer drive shaft that passes through an outer bracket enclosure and that is coupled to an outer magnet carrier, the outer magnet carrier being accommodated within the outer bracket enclosure comprising an annular sleeve comprising an inner surface connected to a plurality of circumferentially spaced apart outer magnets,
    a canister axially accommodated within the outer magnet carrier, the canister comprising an enclosed proximal end that rotatably accommodates a proximal end of a rotor shaft, the canister further comprising a distal end that is connected to a stationary adapter plate, the adapter plate being disposed between the outer bracket enclosure and a pump casing,
    the rotor shaft comprising a distal end that extends axially outward beyond the distal end of the canister before being connected to a rotor disposed in the pump casing,
    the pump casing being disposed between the adapter plate and a head plate, the head plate being connected to a pressure relief valve,
    the proximal end of the canister comprising a membrane heater, the adapter plate comprising a first plurality of circumferentially spaced apart cartridge heaters, the pump casing comprising a first band heater, the head plate comprising a second plurality of spaced cartridge heaters and the pressure relief valve comprising a second band heater.

2. The pump of claim 1 wherein the rotor shaft passes through and is connected to an inner magnet carrier assembly that rotates within the canister in response to rotation of the outer drive shaft and outer magnet carrier, the inner magnet carrier assembly being disposed between the proximal ends of the rotor shaft and canister and the adapter plate being spaced-apart from the proximal ends of the canister and rotor shaft to define an annular cavity extending around the proximal end of the rotor shaft and between the inner magnet carrier and proximal end of the canister,
    the annular cavity being in fluid communication with the pump casing.

3. The pump of claim 2 wherein the membrane heater disposed on the proximal end of the canister surrounds the annular cavity.

4. The pump of claim 3 wherein the fluid communication between the annular cavity and the pump casing passes through the adapter plate.

5. The pump of claim 4 wherein the pump casing is in fluid communication with the pressure relief valve.

6. The pump of claim 5 wherein the membrane heaters disposed on the proximal end of the canister, band heaters disposed on the pump casing and the pressure relief valve and the pluralities of cartridge heaters disposed on the adapter plate are linked to a controller.

7. The pump of claim 6 further comprising at least one thermocouple linked to the controller.

8. The pump of claim 7 wherein a head plate crescent area comprises at least one cartridge heater of the second plurality of cartridge heaters linked to the controller.

9. The pump of claim 7 wherein the at least one thermocouple is disposed in the head plate.

10. The pump of claim 7 wherein the at least one thermocouple is disposed in the pump casing.

11. The pump of claim 7 wherein the at least one thermocouple is disposed in the outer bracket enclosure.

12. The pump of claim 7 wherein the at least one thermocouple is disposed on the canister.

13. The pump of claim 7 wherein the at least one thermocouple comprises thermocouples disposed in the head plate, pump casing and canister.

14. A pump comprising:
    a drive shaft that passes through an outer bracket and that is coupled to a rotor disposed in a pump casing,
    the pump casing being disposed between the outer bracket and a head plate, the head plate being connected to a pressure relief valve,
    the outer bracket and head plate each comprising a plurality of spaced apart cartridge heaters, the pump casing comprising a first band heater and the pressure relief valve comprising a second band heater.

15. The pump of claim 14 wherein the band heaters of the the pump casing and the pressure relief valve and the cartridge heaters of the outer bracket and head plate are linked to a controller.

16. The pump of claim 15 further comprising at least one thermocouple linked to the controller.

17. The pump of claim 16 wherein the at least one thermocouple is disposed in the head plate.

18. The pump of claim 16 wherein the at least one thermocouple is disposed in the pump casing.

19. The pump of claim 16 wherein the at least one thermocouple is disposed in the outer bracket enclosure.

* * * * *